United States Patent [19]

Scott

[11] 4,154,097
[45] May 15, 1979

[54] APPARATUS AND METHOD FOR MEASURING MOTOR POWER

[76] Inventor: Wayne A. Scott, R.R. Saunemin, Saunemin, Ill. 61769

[21] Appl. No.: 825,981

[22] Filed: Aug. 19, 1977

[51] Int. Cl.² .............................................. G01L 3/16
[52] U.S. Cl. ........................................ 73/134; 73/1 C
[58] Field of Search ........................... 73/134, 135, 1 C

[56] References Cited

U.S. PATENT DOCUMENTS

| 2,795,131 | 6/1957 | Booth | 73/1 C |
| 3,115,029 | 12/1963 | Better | 73/1 C |
| 3,321,962 | 5/1967 | Grady | 73/134 |

*Primary Examiner*—Charles A. Ruehl
*Attorney, Agent, or Firm*—Hosier, Niro & Daleiden, Ltd.

[57] ABSTRACT

A dynamometer and method for determining the power of a prime mover includes drive means mounted for rotation by a prime mover, and oscillatory means adapted to move in a linear reciprocal manner. Translation means are provided whereby the rotary motion of the drive means is transformed to linear reciprocal movement of the oscillatory means, the force imposed on the oscillatory means by the translation means being directly proportional to the angular force imposed by the drive means on the translation means. Means are further provided for applying a variable resistive force to the oscillatory means in opposition to movement thereof in one direction without generating significant amounts of friction heat, movement in the one direction being caused by the translation of motion from the drive means. The amount of resistive force imposed on the oscillatory means is correlated with the rotary speed of the drive means to determine the torque of the drive means and the power of the prime mover.

9 Claims, 6 Drawing Figures

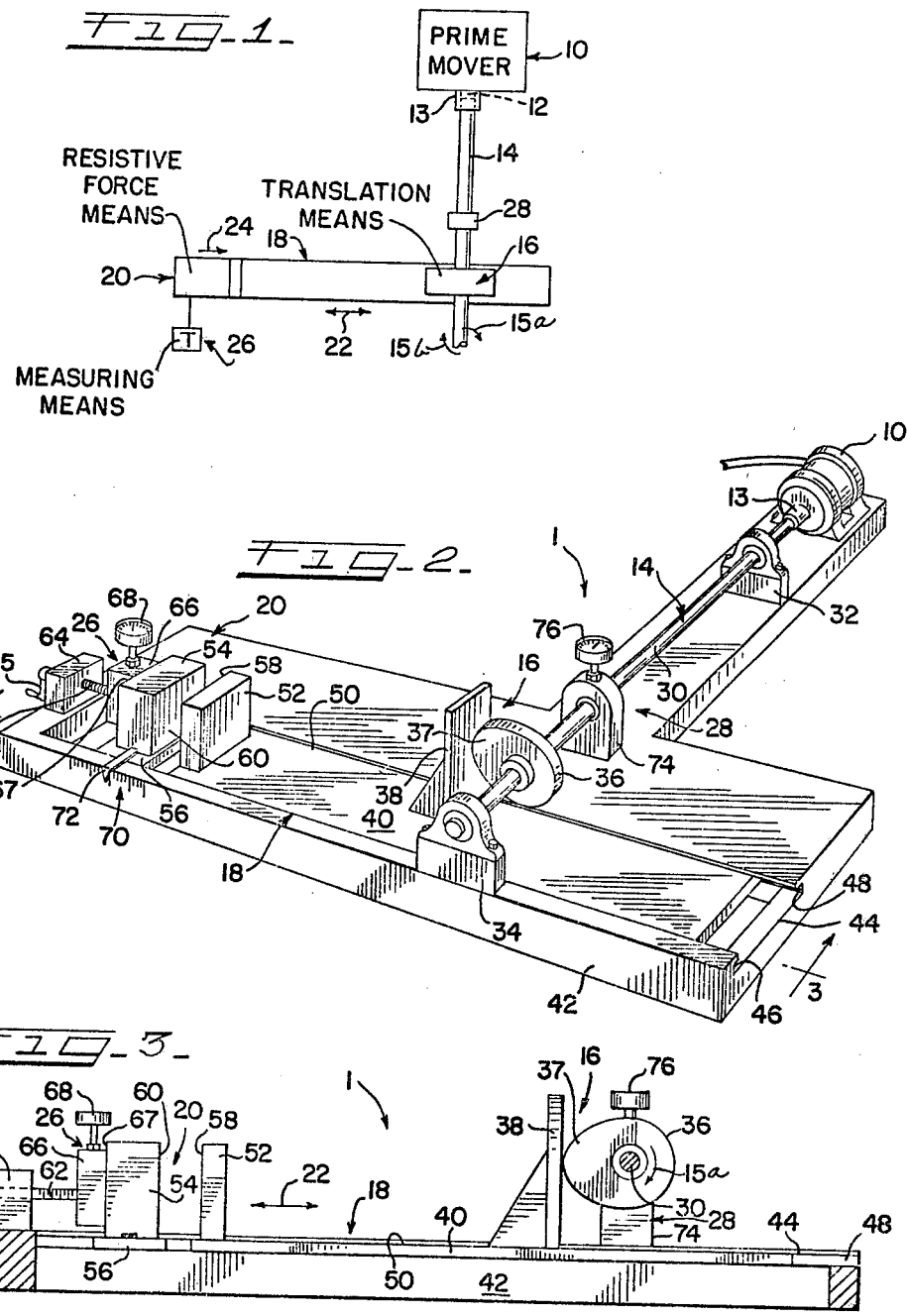

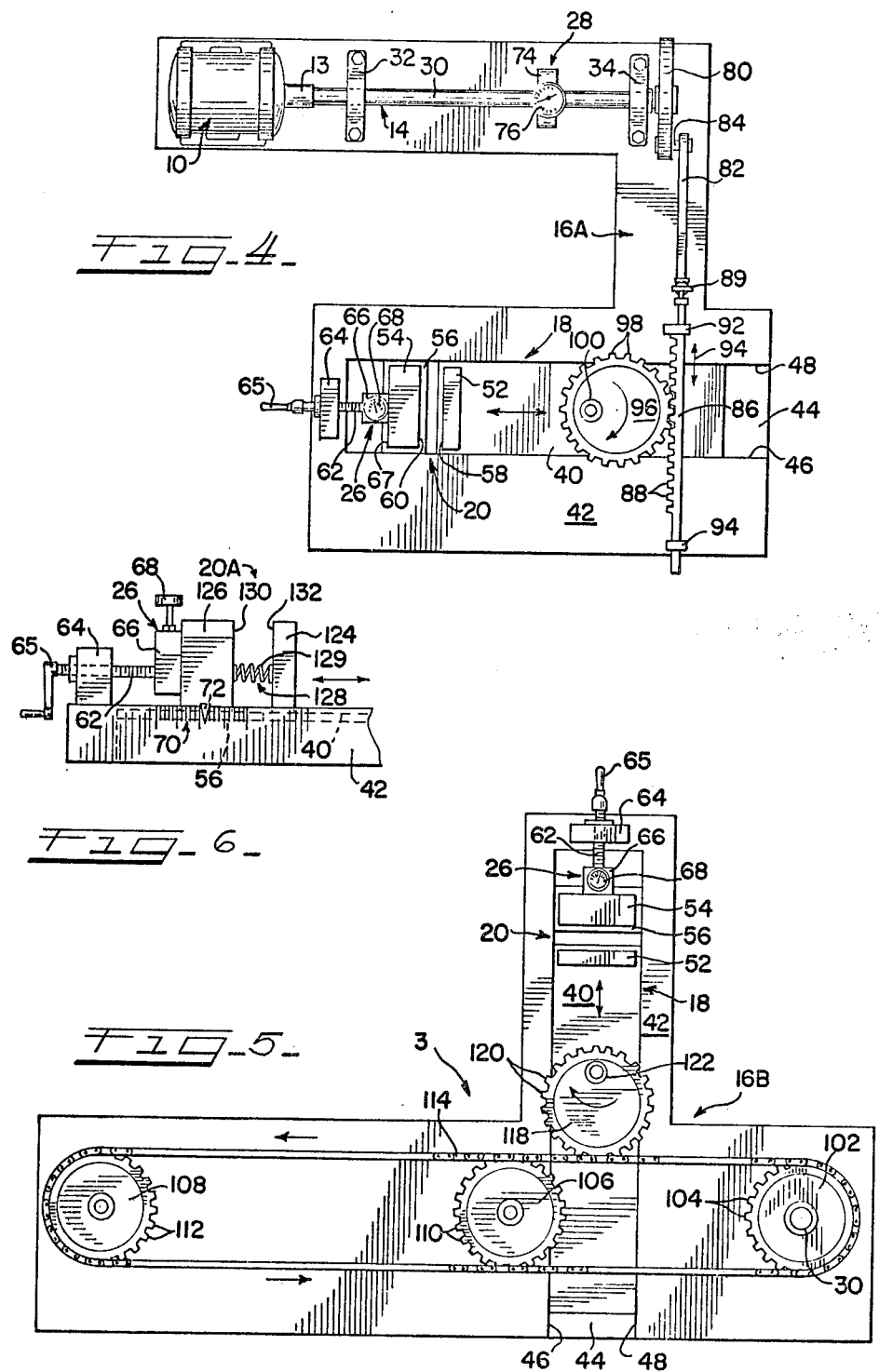

APPARATUS AND METHOD FOR MEASURING MOTOR POWER

BACKGROUND OF THE INVENTION

This invention generally relates to devices and methods for measuring the power output of motors and the like, and more particularly to dynamometers, power absorption devices and related methods for determining the torque of a rotating shaft powered by a motor as a measure of the power of such motor. Specifically, this invention relates to an improved dynamometer and method for measuring the power output of a motor which is simple, inexpensive in construction and operation, and which considerably reduces the problem of friction heat generation inherent in prior devices and methods.

A wide variety of devices, i.e., dynamometers, and methods for measuring the power output of motors such as automobile engines, agricultural machines and other power sources, are presently available. Basically, these prior art devices fall into three broad categories: (1) mechanical braking devices and methods which depend upon frictional energy conversion, (2) hydraulic braking devices and methods which involve absorbing mechanical energy by shearing a working fluid, and, (3) electrical braking devices and methods which utilize variations in field forces or reversals in electric polarity as a means of energy conversion. Moreover, previous devices and methods have often incorporated two or more techniques from the above categories in the same device or method.

Examples of typical prior art mechanical dynamometers and methods are illustrated in U.S. Pat. Nos. 943,391; 1,718,175; 2,306,845, 3,068,689; 3,453,874 and 3,491,579. Such devices generally utilize a friction brake positioned against a rotating shaft powered by a prime mover, the torque of the shaft and thereby power of the prime mover being determined by the amount of torque applied to the brake as determined from devices secured to the brake, the rotary motion of the shaft tending to rotate the brake itself.

Examples of typical prior art hydraulic dynamometers or combinations of mechanical and hydraulic dynamometers and methods are illustrated in U.S. Pat. Nos. 2,035,576; 2,981,099; 2,993,369 and 3,757,908. In these types of dynamometers, the energy of a rotating shaft powered by a prime mover is absorbed by a fluid which in turn is converted to another form of energy which is then measured. Again, as with the mechanical devices, the control of heat generated within the dynamometer is a significant problem. While numerous cooling systems, methods and concepts have been incorporated into these various dynamometers, the problem of heat has not been satisfactorily solved for high power or high RPM applications.

One example of an electromagnetic dynamometer is illustrated in U.S. Pat. No. 2,744,409. Again, the problem of heat generation within the dynamometer is significant.

While such dynamometers and methods as disclosed in the above-noted patents have generally been adequate, the problem of heat generation is still significant. Dynamometers and similar devices and methods measure the power of a prime mover normally by rotating a shaft powered by the prime mover, and converting a portion of the kinetic energy of the rotatary components into another more measurable form. Such conversion generally occurs by partially converting the rotary motion or angular movement of the shaft to another form of motion, particularly to rotary motion of another device as is common with friction disc brake arrangements. Inherent in this conversion is a loss of energy in the form of heat resulting from friction between the rotating shaft and the element directly in contact with the shaft. This is a problem in that the contacting parts become rapidly worn unless the heat is removed. Hence, much of the above prior art is devoted to systems for removing the heat generated within the dynamometer without affecting the measuring function thereof, and many prior art devices have become cumbersome, complicated, and costly to construct and maintain due to the heat removal apparatus associated therewith.

The present invention solves this problem of heat generation not by means or methods of removing the generated heat, but rather by reducing the amount of energy converted to friction heat. This is achieved by converting or translating the rotary motion of a drive means to linear reciprocal motion of an oscillatory means with a minimum loss of evergy in the form of friction heat, and applying a resistive force to the oscillatory means in opposition to the linear motion thereof. U.S. Pat. Nos. 3,550,619 and 3,888,129 disclose arrangements whereby rotary motion is converted to linear reciprocal motion by means of a cam and cam follower. However, neither of these patents recognizes or is concerned with the application of such a principle to the measurement of the power of a motor. Moreover, these patents do not teach the application of a resistive force the translated linear motion. Thus, with very little energy loss in the form of friction heat, the present invention overcomes the heat generation problem inherent in previous dynamometers without complicating the measuring device and method with additional cooling apparatus and steps.

SUMMARY OF THE INVENTION

Accordingly, it is an object of the present invention to provide a device and method for measuring the power output of a motor and the like.

It is another object of the present invention to provide a dynamometer and method for measuring the torque of a shaft powered by a prime mover which minimizes friction and associated heat generation therein.

oscillatory further object of the present invention is to provide an improved dynamometer and method for measuring the torque of a shaft powered by a prime mover whereby the dynamometer and method are simple in construction, maintenance and operation.

Generally, the method of the present invention includes rotating a shaft element powered by a prime mover and translating the rotary movement of the shaft element to linear movement of a carriage so as to move the carriage in a linear reciprocal manner. A resistive force is then applied to the carriage in opposition to movement of the carriage in one linear direction, movement of the carriage in this one direction being caused by the translation of motion from the rotating shaft element. Application of this resistive force converts a portion of the rotational kinetic energy of the shaft element via the translation means and carriage to potential energy stored in the means utilized for applying the resistive force. In this manner, the kinetic energy of the rotating shaft element is translated to and stored as potential energy and is not dissipated as friction heat at the contact area between the translation means and the rotating element. The torque of the shaft element and power of the prime mover are determined from measurements of the applied resistive force and the shaft element rotary speed.

The dynamometer of the present invention which incorporates the above-described method generally includes a shaft mounted for rotation and engageable with a prime mover so as to be rotated thereby. Oscillatory means, preferably a slidable carriage, is provided and mounted for linear reciprocal movement. Means for translating motion interconnect the rotary shaft with the carriage so as to translate the rotary motion of the shaft into linear motion of the carriage. The translation means may be adapted to move the carriage in one direction, or it may move the carriage in both linear reciprocal directions. If the translation means moves the carriage in only one linear direction, separate carriage return means are provided to move the carriage in its opposite linear direction. In one form of the present invention, the translation means comprise a cam secured to the rotatable shaft and a cam follower secured to the carriage.

In one form of the invention, the resistance force is applied to the carriage to directly oppose movement of the carriage caused by the rotary motion of the shaft via the translation means by one or more pair of opposed magnets, one magnet of each pair being secured for movement with the carriage and the second magnet being movable toward and away from the first magnet. The poles of the magnets facing each other are identical so that the magnets tend to repel each other. In this manner, when the magnets are moved towards each other, the resistance force imposed upon the carriage is increased. Therefore, the resistance force used to measure the torque of the rotating shaft is applied directly to a linearly moving element rather than the rotational shaft as is frequently the case with previous dynamomoters.

The resistance force is applied to the carriage so as to offer resistance to the rotation of the shaft to dissipate its kinetic energy. This kinetic energy is substantially transferred via the translation means and the carriage to the resistance force means in the form of potential energy, with a minor amount of the translated kinetic energy being dissipated in the form of friction heat at the contact surface between the shaft and the translation means. Of course, various bearing arrangements well known to those skilled in the art may be employed to reduce the generation of heat even further. The amount of resistance force imposed on the carriage by the magnets and the rotational speed of the shaft are measured, the torque of the drive shaft being computed by conventional means from such measurements. By any conventional means, the power of the prime mover is then determined from the measured torque.

BRIEF DESCRIPTION OF THE DRAWINGS

The novel features which are believed to be characteristic of the invention are set forth in the appended claims. The invention itself, however, together with further objects and attendant advantages thereof, will become apparent and best understood from the following detailed description taken in connection with the accompanying drawings, setting forth by way of illustration and example certain embodiments of invention, in which:

FIG. 1 is a diagrammatic illustration showing the method of the present invention;

FIG. 2 is a perspective schematic view of one embodiment of the dynamometer of the present invention;

FIG. 3 is a side plan schematic view taken substantially along line 3—3 of the embodiment illustrated in FIG. 2;

FIG. 4 is a top plan perspective schematic view illustrating a second embodiment of a dynamometer constructed according to the present invention;

FIG. 5 is a perspective schematic view of a third embodiment of a dynamometer constructed according to the present invention; and FIG. 6 is a partial front perspective schematic view of an embodiment of the resistive force means of a dynamometer constructed according to the present invention.

DETAILED DESCRIPTION OF THE PREFERRED EMBODIMENTS

Turning first to FIG. 1 which diagrammatically illustrates the method and apparatus of the present invention, a motor or prime mover 10 conventionally has an output shaft 12. The power output of the motor or prime mover 10 can be readily determined from the torque and RPM of the shaft 12 by methods known to the art. The method and apparatus of the present invention measures such torque by coupling a means for rotary drive 14 to the output shaft 12 to rotate therewith. Any conventional shaft coupling 13 may be utilized for this purpose. The rotary motion of the drive means 14, indicated by arrows 15a and 15b, is translated in part by means 16 into linear reciprocating motion of a means 18 adapted for oscillatory movement, as indicated by arrow 22. In addition, a portion of the kinetic energy of drive means 14 is transformed, in part, to friction heat arising from contact between surfaces in the translation means 16 and the oscillatory means 18 and, in part, to potential energy as described below.

A resistive force is applied by means 20 to the motion of the oscillatory means 18 in one direction, as indicated by arrows 22 and 24. The motion of the oscillatory means 18 in this one direction which is resisted by means 20 is imparted thereto by the drive means 14 via the translation means 16. It is optional, as described in greater detail below, as to whether the motion of the oscillatory means 18 in the opposite direction is also caused by the rotary motion of the drive means 14 via the translation means 16 or by some other means. As the resistive force is applied by means 20 to the oscillatory means 18, the amount of force so applied is measured at device 26. In addition, the rotary speed of the drive means 14 is also measured by a conventional measuring device 28, such as a tachometer. These measurements by devices 26 and 28 are then converted by any well known conventional method or means to determine the torque of the drive means 14 and the power output of the prime mover 10.

Referring now to a preferred embodiment illustrated in FIGS. 2 and 3, a dynamometer 1 includes a drive means 14 which preferably comprises a shaft 30 coupled to a shaft (not illustrated) of a prime mover 10 by a coupling 13. The shaft 30 may be adapted for rotation in either the clockwise or counterclockwise direction, or for both, provided the particular translation means is also so adapted. In some instances, the translation means may be so configured as to preclude rotation in both directions. It should be noted that like numbers for like elements are used throughout these figures and this specification. The shaft 30 is supported for rotation by brackets 32, 34. Disposed near the end of shaft 30 is the translation means 16 which is preferred form comprises a cam 36 with cam lobe 37 and a cam follower 38. The cam 36 is mounted about the shaft 30 for rotation therewith, while the cam follower 38 is secured to the oscillatory means 18, which in preferred form comprises a carriage 40 mounted for linear reciprocal movement along a support base 42. In the illustrated embodiment, a channel 44 having substantially parallel sidegrooves 46, 48 is provided along the top 50 of the support base 42. The carriage 40 is mounted within the channel 44 so that the edges thereof fit within grooves 46, 48 and carriage 40 slidingly moves along channel 44 in a linear manner. Thus, as the shaft 30 rotates, the movement of the cam lobe 37 against the cam follower 38 will cause the carriage 40 to move in a direction along the channel 44 away from the shaft 30 thereby translating the rotary motion of the shaft 30 into linear motion of the carriage 40. It should be noted that any means may be utilized to enable the carriage 40 to move linearly along the base 42, such as the channel 44 described above, a track and groove arrangement, a roller bearing arrangement and the like.

The resistance force means 20, as illustrated in FIGS. 2 and 3, preferably comprise two opposed magnets 52 and 54. First magnet 52 is mounted to the carriage 40 so as to move linearly therewith along the channel 44 in the base 42. The second magnet 54 is mounted to a second carriage 56 which is also disposed within the channel 44 for independent sliding movement therealong. The carriage 56 is further adapted to be selectively secured against movement within the channel 44.

The opposed faces 58, 60 of the magnets 52, 54 are identical in polarity so that the magnetic fields of the magnets 52 and 54 are opposed to each other. In this manner, the magnet 54 performs two functions. First, as the cam lobe 37 moves away from the cam followwer 38 so that the rotary motion of the shaft 30 is no longer being transmitted to the carriage 40, the force from the stationary magnet 54 against the magnet 52 moves the carriage 40 and the cam follower 38 toward the shaft 30 to maintain contact between the cam 36 and the cam follower 38, thereby enabling the carriage 40 to move in a reciprocal manner. This force is termed the "carriage return force." Second, the repelling force between the magnetic fields of the magnets 54 and 52 resists the motion of the carriage 40 and the cam follower 38 as the carriage 40 is moved away from the shaft 30 by the cam 36. It is this repelling or resistive force between the magnets 52 and 54 against the motion of the carriage 40 which is measured. Of course, this force may be increased or decreased as the distance between the magnets 52 and 54 is increased or decreased by adjustment of the position of the carriage 56 within the channel 44.

To control the amount of resistance force offered by the resistive force means 20, the magnet 54 and the carriage 56 are selectively positioned along the channel 44 by a threaded screw 62 which is mounted within a block 64 secured to the base 42. Thus, turning of the screw 62 with the handle 65 will increase or decrease the distance between the magnets 52 and 54 and thereby control the amount of resistance force imposed against the motion of the carriage 40. To measure the resistive force imposed by means 20, any conventional manner or means may be used. Preferably, a pressure transducer 66 is mounted between the screw 62 and the rear face 67 of the magnet 54 so that the screw 62 bears directly on the transducer 66. The force which occurs at this point is measured by the transducer 66 and converted to a signal discernible at the meter 68 by the operator of the dynamometer 1. In addition or alternatively, a scale 70 may be secured against the base 42 beneath the carriage 56 with an indicator 72 being mounted to the carriage 56. Thus, the indicator 72 and the scale 70 may be used, after equilibration, to determine the amount of force being offered by the resistive force means 20, and they may also be used simply as an approximate distance marker for the position of magnet 54.

It should be noted that a certain amount of force between the magnets 52 and 54 is required in the illustrated embodiment even when the magnets 52 and 54 are in a relatively open position in order that a carriage return force is present to enable the carriage 40 to move in a reciprocal manner. This degree of force is minor with respect to its effect on the rotation of the shaft 30. However, the meter 68 should be adjusted to take this minor amount of carriage return force into consideration when measuring the resistive force as the magnets 52 and 54 are closed toward each other. Furthermore, other separate means such as a separate spring means (not illustrated) may be utilized to create the carriage return force, in which case the open position of the magnets 52 and 54 is such that the distance between the magnets 52 and 54 is sufficiently great so that their respective magnetic fields do not inter-react.

The rotary speed of the shaft 30 may be measured in any conventional manner. In the illustrated embodiment, measuring means 28 comprises a conventional tachometer 74 secured to the base 42 about shaft 30 and a measuring meter 76.

In operation, the shaft 30 is rotated by the prime mover 10. The rotary motion of the shaft 30 is translated into linear motion of the carriage 40 in a direction away from the shaft 30 by the interaction of the cam 36 and the cam follower 38. The carriage 40 is also moved in a linear direction toward the shaft 30 by the return carriage force created by the magnets 52 and 54, thereby causing the carriage 40 to move in a linear reciprocal manner as the shaft 30 rotates. The screw 62 is then turned to decrease the distance between the magnets 52 and 54, and this creates a resistive force between the magnets 52 and 54 in opposition of the motion of the carriage 40 in a direction away from the shaft 30. This resistive force imposes a load on the shaft 30 through increased pressure contact between the cam 36 and the cam follower 38, and the measurement of the shaft RPM in conjunction with the measurement of the resistance force enables the operator of the dynamometer 1 to determine the torque of the shaft 30 and the power of the prime mover 10.

A distinct advantage of the present invention is that as the load is imposed on the shaft 30 by the resistive force of the magnets 52, 54, the dissipation of kinetic energy does not generate substantial heat through friction as is generally the case with prior art dynamometers. Only a small portion of this energy is transformed into friction heat energy at the junctions between the cam 36 and the cam follower 38 and between the carriage 40 and the channel 44. The majority of the dissipated energy is converted into potential energy as the magnet 52 is moved toward the magnet 54 by the interaction of the lobe 37 and the cam follower 38. This potential energy is subsequently released in the form of kinetic energy when the carriage 40 moves in a direction back toward the shaft 30. Therefore, elaborate cooling methods and means as utilized with previous dynamometers are not necessary with the present invention. It is optional, however, to provide simple cooling means such as air or liquid layers (not illustrated) to remove the minor amount of friction heat generated between the cam 36 and the cam follower 38 and/or between the carriage 40 and the channel 44.

Turning now to FIG. 4, a second embodiment of the present invention is illustrated wherein a somewhat different translation means 16A is utilized in a dynamometer 2. In this particular embodiment, a drive wheel or disc 80 is mounted to the end of the shaft 30 for rotation therewith. A pivot arm 82 is mounted at one end to the disc 80 by an off-center pivot pin 84. The other end of the arm 82 is secured to a gear rod 86 having a plurality of gear teeth 88 disposed along the length thereof. The arm 82 is secured to the rod 86 by a universal joint 89, and slide bearings 90, 92 are preferably provided so that the rod 86 may only move in a linear direction. This linkage arrangement between the rod 86, the universal joint 89, the arm 82 and the disc 80 is such that as the disc 80 rotates, the rod 86 will move in a linear reciprocal manner. Thus, the rotary motion of the shaft 30 is translated into linear reciprocal motion of the rod 86. In this particular embodiment, the shaft 30 moves the rod 86 in both linear directions as indicated by arrow 94. Movement of the rod 86 is generally controlled by the diameter of the disc 80 and the position of the pivot pin 84 thereon.

To translate the motion of the rod 86 to the carriage 40, a free sprocket wheel 96 having cogs 98 disposed thereabout is mounted to the carriage 40 by a conventional pivot bearing (not illustrated) diposed between the wheel 96 and the carriage 40. The sprocket wheel 96 has an offset pivot pin 100 connected to the pivot bearing (not illustrated) so that as the rod 86 oscillates, this linear reciprocal motion is transferred to the carriage 40 via the sprocket wheel 96. The other portions and functions of the dynamometer 2 are the same as illustrated in FIGS. 2 and 3. It should be pointed out that in this particular embodiment, both directions of movement of the carriage 40 are imparted by the rotary motion of the shaft 30 via translation means 16A so that a separate means to create a return carriage force is not necessary. Thus, the magnets 52 and 54 function solely as the source of the resistance force.

In FIG. 5, a dynamometer 3 includes another embodiment of the translation means 16B very similar to that of 16A in FIG. 4. It should be noted, however, that the prime mover (not illustrated) and shaft 30 are in different planes from the remainder of dynamometer 3, although such could be avoided with additional gearing structure. In this particular embodiment, translation means 16B includes a drive wheel or disc 102 having a plurality of cogs 104 disposed thereabout secured to the end of the shaft 30 for rotation therewith. Two idler sprocket wheels 106, 108 are mounted for free rotation and provided with cogs 110 and 112, respectively. An endless gear chain 114 is secured about the disc 102 and the idler sprocket wheels 106, 108 so as to snugly engage the cogs 104, 110 and 112. In this manner, as the disc 102 rotates with the shaft 30, the chain 114 is driven about the disc 102 and the idler sprocket wheels 106 and 108. A free sprocket wheel 118 having a plurality of cogs 120 disposed thereabout is mounted on a conventional pivot bearing (not illustrated) secured to the carriage 40. The sprocket wheel 118 has a pivot pin 122 secured to the pivot bearing (not illustrated) which is off-center relative to the central axis of the sprocket wheel 118. The cogs 120 of the wheel 118 enmesh with the gear chain 114 as the chain 114 travels about the disc 102 and the idler sprocket wheels 106, 108, and as the disc 102 rotates, the free sprocket wheel 118 also rotates, and the off-center pivot pin 122 and the pivot bearing (not illustrated) cause the carriage 40 to move in a linear reciprocal manner as described above. Thus, the rotary motion of the shaft 30 drives the carriage 40 in both linear directions so that a separate means for providing a carriage return force is not necessary in this embodiment.

Turning to FIG. 6, a second embodiment of the resistive force means 20A is illustrated. In this embodiment, a pair of upstanding block members 124 and 126 are provided with a resilient member 128 disposed therebetween. Preferably, the block member 124 is secured for movement with the carriage 40, and the block member 126 is secured for movement with the carriage 56, similar to the magnets 52, 54 of the previously described embodiments. The resilient member 128 is preferably a compressed spring 129 secured at its ends to the opposed faces 130, 132 of the blocks 124, 126 so as to tend to force the blocks 124 and 126 apart. Thus, as the block 126 is moved toward the block 124 by the screw 62, the amount of resistance force created by means 20A against the movement of the carriage 40 increases and is measured by the transducer 66. It should be noted that in this embodiment, the resilient member 128 may be utilized to provide the return carriage force, or a separate means (not illustrated) may be utilized, in which case the member 128 is adapted to provide substantially zero force between the blocks 124 and 126 when the blocks 124 and 126 are in their completely open position relative to each other.

Other various means for providing the translation of the rotary motion of the shaft 30 to the carriage 40 or for providing the resistance force to the movement of the carriage 40 in a direction away from the shaft 30 are contemplated for use with the present invention. For example, the resistance force means 20 could comprise a spring arrangement whereby the resistance force is increased by stretching a spring rather than by compressing the spring as illustrated in FIG. 6. These and other various alternatives and embodiments are all to be considered within the scope of the present invention.

As can be seen from the above, the present invention offers a simple, inexpensive, yet very effective method and apparatus for measuring the power output of a motor or prime mover. Furthermore, the present apparatus and method greatly reduce the problems associated with friction heat in prior art devices without requiring extensive and complicated cooling apparatus or methods by translating the rotary motion of the prime mover's output shaft into linear reciprocal motion and then opposing the linear motion. This translation into linear reciprocal movement enables a portion of the rotational energy of the output shaft to be converted into potential energy rather than be lost as friction heat energy.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein but may be modified within the scope of the appended claims.

I claim:

1. A dynamometer, comprising:
   drive means mounted for rotation by a prime mover;
   oscillatory means mounted for linear reciprocal movement;
   means for translating rotary motion of said drive means to linear motion of said oscillatory means to move said oscillatory means alternately in a first linear direction and in a second opposite linear direction;
   means for applying a resistive force to said oscillatory means in opposition to movement thereof in said first linear direction, said movement in said first linear direction being caused by the translation of rotary motion from said drive means; and
   means for measuring said resistive force to determine the torque of said drive means.

2. The dynamometer as described in claim 1, wherein said translating means comprises drive wheel means secured for rotation with said drive means, sprocket wheel means for moving said oscillatory means in said first and second linear directions, and intermediate means for translating the motion of said drive wheel means to said sprocket wheel means.

3. The dynamometer as described in claim 2, wherein said intermediate means comprises a gear rod movable in a linear reciprocal manner and including means for engaging said sprocket wheel means, a pivot arm pivotally secured off-center to said drive wheel means, and universal connector means interconnecting said pivot arm and said gear rod and including means for translating the motion of said pivot arm to the linear reciprocal motion of said gear rod.

4. The dynamometer as described in claim 2, wherein said intermediate means comprises at least one idler sprocket wheel and an endless gear chain adapted for rotational engagement with said idler sprocket wheel, said drive wheel means, and said sprocket wheel means.

5. A dynamometer, comprising:
   drive means mounted for rotation by a prime mover;
   oscillatory means mounted for linear reciprocal movement;
   means for translating rotary motion of said drive means to linear motion of said oscillatory means in only a first linear direction comprising cam means secured to said drive means, and cam follower means secured to said oscillatory means for contact with said cam means;
   means for applying a resistive force to said oscillatory means in opposition to movement thereof in said first linear direction, said movement in said first linear direction being caused by the translation of rotary motion from said drive means; and
   means for measuring said resistive force to determine the torque of said drive means.

6. The dynamometer as described in claim 5 wherein said means for applying a resistive force comprises a first magnet means secured to said oscillatory means for linear reciprocal movement therewith, and a second magnet means mounted to face said first magnet means and including means to vary the distance between said first and second magnet means, the opposed faces of said first and second magnet means being of the same polarity to create repelling magnetic fields therebetween.

7. A dynamometer comprising:
   a rotatable shaft including means for coupling said shaft to a prime mover;
   carriage means mounted for linear reciprocal movement;
   means for translating rotary motion of said shaft to linear motion of said carriage means;
   means for applying a resistive force to said carriage means in opposition to movement thereof in a first linear direction, said movement in said first linear direction resulting from the translation of said rotary motion of said shaft wherein said means for applying a resistive force to said carriage means comprises a first magnet means secured to said carriage means for linear reciprocal movement therewith, and a second magnet means mounted opposite said first magnet means and including means to vary the distance between said first and second magnet means, the opposed faces of said first and second magnet means being of the same polarity and within the magnetic field generated by the opposed magnet means, said first and second magnet means tending to move apart and thereby create said resistive force;
   means for measuring said variable resistive force; and
   means for measuring the rotary speed of said shaft.

8. A method of determining the power of a prime mover comprising rotating a shaft with said prime mover, measuring the rotary speed of said shaft, translating the rotary motion of said shaft to linear motion of an oscillatory means adapted for linear reciprocal movement, applying a resistive force to said oscillatory means in opposition to movement thereof in a first linear direction, said movement in said first linear direction being caused by said translation of rotary motion from said shaft, said oscillatory means being alternately moved in a second linear direction opposite to said first linear direction by said translation of rotary motion from said drive means, measuring said resistive force, and correlating the measurements of said rotary speed and said resistive force to determine the torque of said shaft and the power of said prime mover.

9. The method as described in claim 8, wherein the step of applying a resistive force to said oscillatory means comprises generating a first magnetic field with a first magnetic means secured for movement with said oscillatory means, and generating a second magnetic field within the field of said first magnetic means, said first and second magnetic fields being of identical polarity so as to tend to repel each other.

* * * * *